(12) United States Patent
Chen

(10) Patent No.: US 11,630,349 B1
(45) Date of Patent: Apr. 18, 2023

(54) BACKLIGHT MODULE AND DISPLAY HAVING THE SAME

(71) Applicant: Qisda Corporation, Taoyuan (TW)

(72) Inventor: Chun-Ting Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/728,899

(22) Filed: Apr. 25, 2022

(30) Foreign Application Priority Data

Nov. 11, 2021 (TW) ................................. 110142086

(51) Int. Cl.
*G02F 1/1335* (2006.01)
*G02F 1/13357* (2006.01)

(52) U.S. Cl.
CPC .. *G02F 1/133628* (2021.01); *G02F 1/133608* (2013.01)

(58) Field of Classification Search
CPC ..................... G02F 1/133628; G02F 1/133608
See application file for complete search history.

(56) References Cited

U.S. PATENT DOCUMENTS

2007/0182884 A1\* 8/2007 Lin ................... G02F 1/133608
349/65

FOREIGN PATENT DOCUMENTS

| CN | 210470094 U | 5/2020 |
| CN | 113140169 A | 7/2021 |
| TW | 516814 | 1/2003 |

OTHER PUBLICATIONS

Office action of counterpart application by Taiwan IP Office dated Apr. 18, 2022.

\* cited by examiner

Primary Examiner — Karabi Guharay

(57) ABSTRACT

A backlight module and a display having the same are provided. The backlight module includes a front bezel, a back cover, and a light source. The back cover is disposed opposite to the front bezel. The back cover includes a body and one or more heat dissipation elements. The body has one or more openings corresponding to one or more heat sources. The one or more heat dissipation elements are disposed in the one or more openings, respectively. The light source is disposed between the front bezel and the back cover.

18 Claims, 4 Drawing Sheets

BACKLIGHT MODULE AND DISPLAY HAVING THE SAME

This application claims the benefit of Taiwan application Serial No. 110142086, filed Nov. 11, 2021, the subject matter of which is incorporated herein by reference.

TECHNICAL FIELD

This disclosure relates to a backlight module and a display having the same. More particularly, this disclosure relates to a backlight module including one or more heat dissipation elements and a display having the same.

BACKGROUND

As the development of displays, there is a requirement for increasing a number of partitions for the local area dimming function. In such a condition, heat dissipation becomes a critical issue for improvement of the product performance.

One solution is replacing the conventional iron back cover of a backlight module with an aluminum back cover. Aluminum has a better thermal conductivity than iron. However, a mechanical strength of aluminum is lower than iron, and thus the overall strength of the backlight module may be decreased. In addition, the cost may be increased.

Another solution is disposing an additional heat dissipation plate in the iron back cover. However, since the heat dissipation plate is covered by the body of the iron back cover, the heat dissipation performance is not as good as expected.

SUMMARY

The disclosure is focused on improvement of the heat dissipation performance.

According to some embodiments, a backlight module is provided. The backlight module comprises a front bezel, a back cover, and a light source. The back cover is disposed opposite to the front bezel. The back cover comprises a body and one or more heat dissipation elements. The body has one or more openings corresponding to one or more heat sources. The one or more heat dissipation elements are disposed in the one or more openings, respectively. The light source is disposed between the front bezel and the back cover.

According to some embodiments, a display is provided. The display comprises a display front bezel, a display back cover, a display panel, and a backlight module. The display panel is disposed between the display front bezel and the display back cover. The backlight module is disposed between the display front bezel and the display back cover. The backlight module is substantially disposed at a backside of the display panel. The backlight module comprises a front bezel, a back cover, and a light source. The back cover is disposed opposite to the front bezel. The back cover comprises a body and one or more heat dissipation elements. The body has one or more openings corresponding to one or more heat sources. The one or more heat dissipation elements are disposed in the one or more openings, respectively. The light source is disposed between the front bezel and the back cover.

Figure 1:
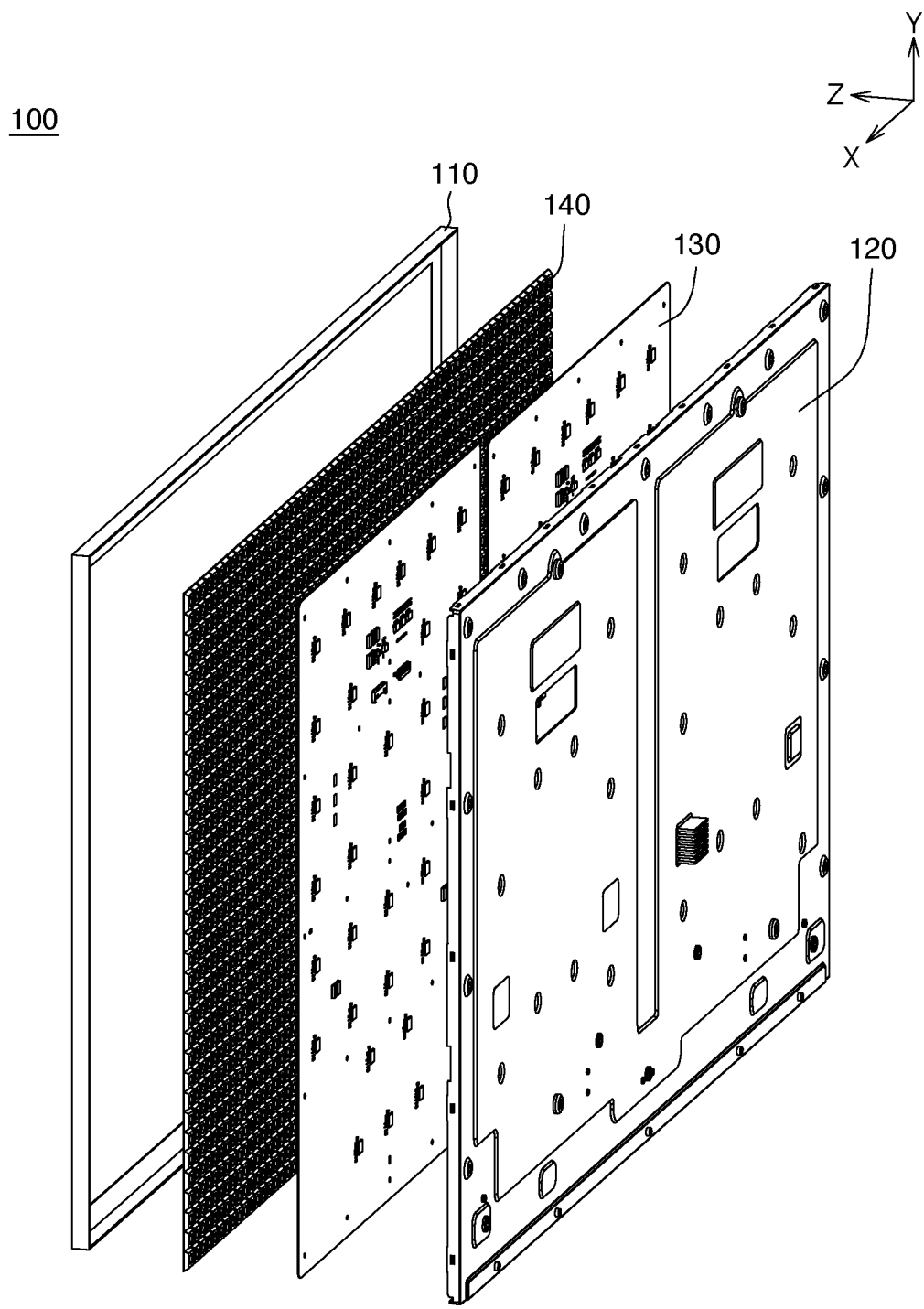
FIG. 1 shows an exemplary backlight module.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A backlight module according to embodiments comprises a front bezel, a back cover, and a light source. The back cover is disposed opposite to the front bezel. The back cover comprises a body and one or more heat dissipation elements. The body has one or more openings corresponding to one or more heat sources. The one or more heat dissipation elements are disposed in the one or more openings, respectively. The light source is disposed between the front bezel and the back cover.

A display according to embodiments comprises a display front bezel, a display back cover, a display panel, and a backlight module. The display panel is disposed between the display front bezel and the display back cover. The backlight module is disposed between the display front bezel and the display back cover. The backlight module is substantially disposed at a backside of the display panel. The backlight module comprises a front bezel, a back cover, and a light source. The back cover is disposed opposite to the front bezel. The back cover comprises a body and one or more heat dissipation elements. The body has one or more openings corresponding to one or more heat sources. The one or more heat dissipation elements are disposed in the one or more openings, respectively. The light source is disposed between the front bezel and the back cover.

The details of the backlight module and the display will be described more fully hereinafter with reference to accompanying drawings. The description and the accompanying drawings are provided for illustrative only, and not intended to result in a limitation. For clarity, the components may not be drawn to scale. In addition, some components and/or reference numerals may be omitted from some drawings. It is contemplated that the elements and features of one embodiment can be beneficially incorporated in another embodiment without further recitation.

Referring to FIG. 1, an exemplary backlight module 100 is shown. The backlight module 100 comprises a front bezel 110, a back cover 120, and a light source 130.

The front bezel 110 may be any suitable front bezel typically used in backlight modules. The details of which will be omitted herein.

Figure 2:
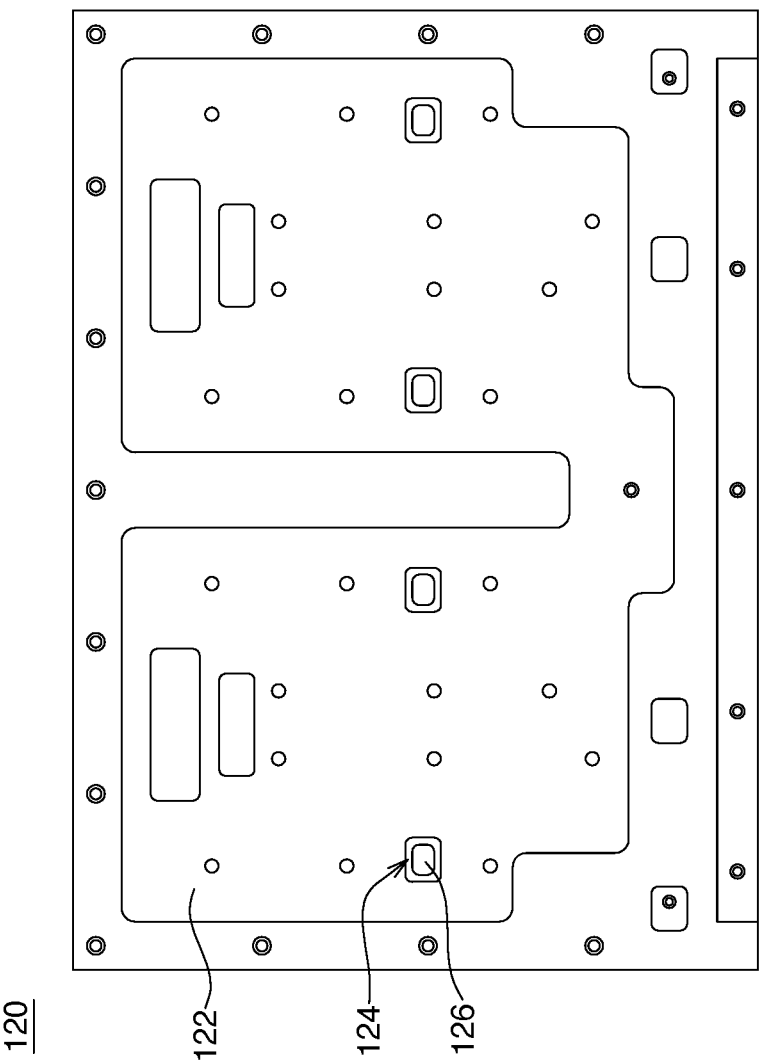
FIG. 2 shows an exemplary back cover of a backlight module.
Figure 3:
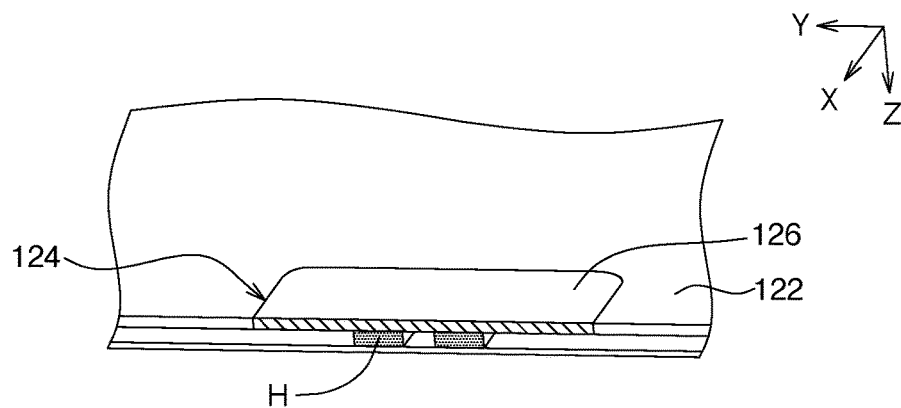
FIG. 3 shows an exemplary heat dissipation element.

The back cover 120 is disposed opposite to the front bezel 110. Referring to FIGS. 2 and 3, the back cover 120 comprises a body 122. The body 122 has one or more openings 124 corresponding to one or more heat sources H. It should be understood that each opening 124 may correspond to a single heat source H or may correspond to two or more heat sources H which are nearby to each other.

The back cover 120 further comprises one or more heat dissipation elements 126. The one or more heat dissipation elements 126 are disposed in the one or more openings 124, respectively. The one or more heat dissipation elements 126 may be disposed through any suitable means, such as stamping, riveting, pressing, or locking with screws, but the disclosure is not limited thereto. The one or more heat dissipation elements 126 may be connected to the body 122. In some embodiments, the one or more heat dissipation elements 126 may form a continuous surface with the body 122.

According to some embodiments, the one or more heat dissipation elements 126 may comprise a heat dissipation element flush with the body 122. According to some embodiments, the one or more heat dissipation elements 126 may comprise a heat dissipation element protruding from the body 122. According to some embodiments, the one or more heat dissipation elements 126 may comprise heat dissipation elements having different heights from the body 122. As one example, a protruding height of one of the heat dissipation elements 126 may be H1, and a protruding height of another one of the heat dissipation elements 126 may be H2 larger than H1, in order to match the heat sources H having different heights. As another example, a protruding height of one of the heat dissipation elements 126 may be 0, and a protruding height of another one of the heat dissipation elements 126 may be H larger than 0. According to some embodiments, the one or more heat dissipation elements 126 may comprise a heat dissipation element directly contacting a corresponding heat source H. According to some embodiments, the one or more heat dissipation elements 126 may comprise a heat dissipation element with a heat dissipation pad disposed between the heat dissipation element and a corresponding heat source H. According to some embodiments, the one or more heat dissipation elements 126 may comprise a heat dissipation element formed with fins, which can increase the heat dissipation area.

Figure 4:
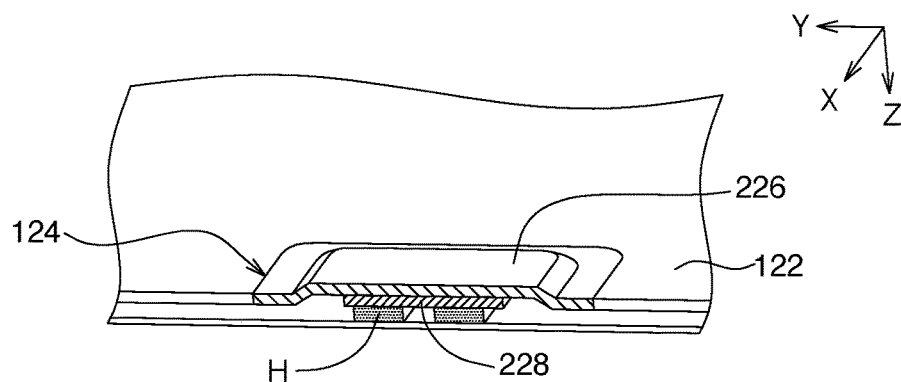
FIG. 4 shows another exemplary heat dissipation element.
Figure 5:
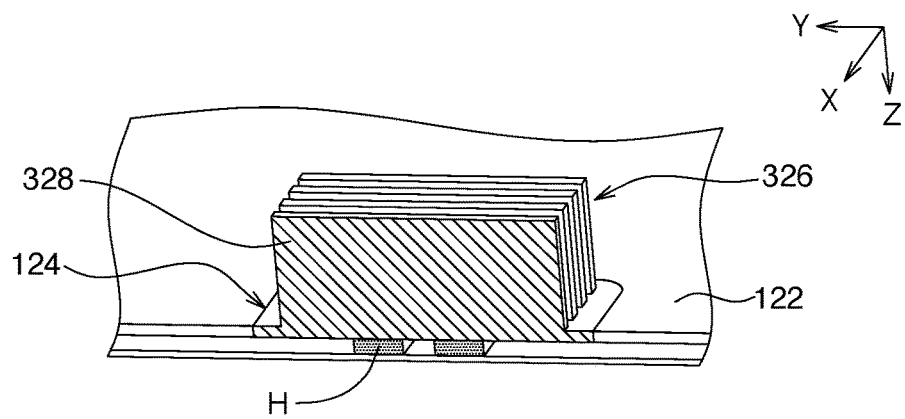
FIG. 5 shows still another exemplary heat dissipation element.

Some examples for the heat dissipation elements are provided in FIGS. 3 to 5. Referring to FIG. 3, the exemplary heat dissipation element 126 is flush with the body 122. In addition, the heat dissipation element 126 directly contacts the two corresponding heat sources H. Referring to FIG. 4, the exemplary heat dissipation element 226 protrudes from the body 122. In addition, there is a heat dissipation pad 228 disposed between the heat dissipation element 226 and the two corresponding heat sources H.

Referring to FIG. 5, the exemplary heat dissipation element 326 is formed with fins 328. In addition, the heat dissipation element 326 directly contacts the two corresponding heat sources H.

It should be understood that the various types of heat dissipation elements 126 as described above may be used individually, in any possible combination, or even in combination with other types of heat dissipation elements in one back cover 120 depending on needs.

Since the one or more heat dissipation elements 126 is disposed in the one or more openings 124, each heat dissipation element 126 is exposed and not covered by the body 122. As such, a good heat dissipation performance can be provided. In addition, a material of the one or more heat dissipation elements 126 of the back cover 120 has a better thermal conductivity than a material of the body 122. Meanwhile, the material of the body 122 of the back cover 120 may have a higher mechanical strength than the material of the one or more heat dissipation elements 126. As such, both the mechanical strength requirement and the heat dissipation performance can be achieved. For example, the material of the body 122 may be an iron-based material, and the material of the one or more heat dissipation elements 126 may be aluminum or copper, but the disclosure is not limited thereto.

Referring back to FIG. 1, the light source 130 is disposed between the front bezel 110 and the back cover 120. In some embodiments, the one or more heat sources H comprise a light emitting device of the light source 130. According to some embodiments, the light source 130 may be a direct type light source.

According to some embodiments, the backlight module 100 may further comprise other components, such as a reflector 140, but the disclosure is not limited thereto.

Figure 6:
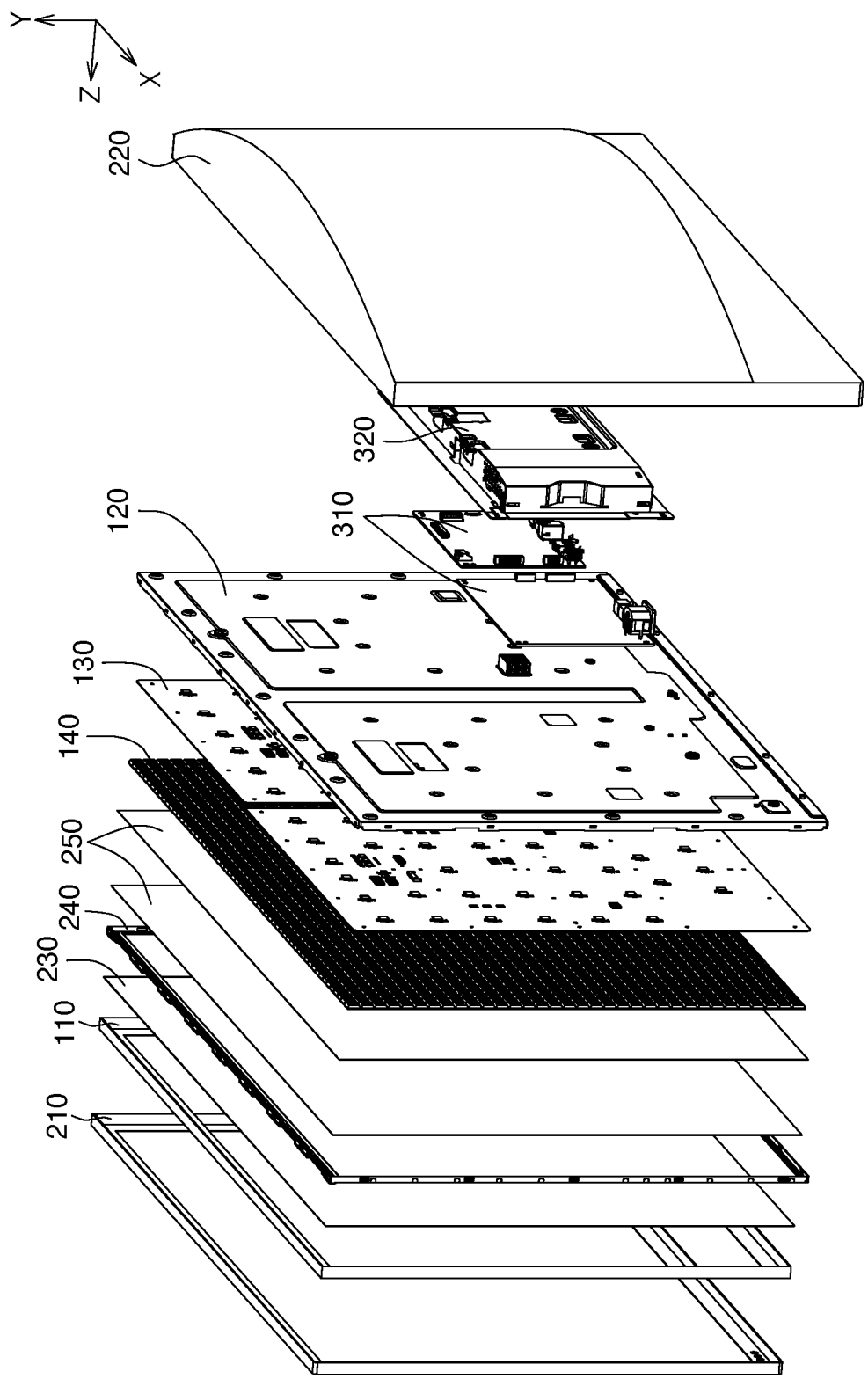
FIG. 6 shows an exemplary display.

Referring to FIG. 6, an exemplary display 10 is shown. The display 10 comprises a display front bezel 210, a display back cover 220, a display panel 230, and the backlight module 100. The display panel 230 is disposed between the display front bezel 210 and the display back cover 220. The backlight module 100 is disposed between the display front bezel 210 and the display back cover 220. The backlight module 100 is substantially disposed at a backside of the display panel 230. It means that the major components of the backlight module 100 except for the front bezel 110 are disposed at the backside of the display panel 230. The details of the backlight module 100 have been provided as above, and will be omitted herein. According to some embodiments, the display panel 230 may be a liquid crystal display panel, and the backlight module 100 may be a direct type backlight module.

According to some embodiments, the display 10 can further comprises other components. For example, in addition to the display front bezel 210, the display back cover 220, and the display panel 230, the display module of the display 10 may further comprise a frame 240 and optical films 250, but the disclosure is not limited thereto. In addition, the display 10 may further comprise a printed circuit board assembly (PCBA) 310 and a housing 320 for the PCBA 310, but the disclosure is not limited thereto.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A backlight module, comprising:
  a front bezel;
  a back cover disposed opposite to the front bezel, the back cover comprising:
    a body having one or more openings corresponding to one or more heat sources; and
    one or more heat dissipation elements disposed in the one or more openings, respectively; and
  a light source disposed between the front bezel and the back cover;
  wherein the body has a front surface toward the front bezel and the light source and a back surface opposite to the front surface, and the one or more heat dissipation elements comprise a heat dissipation element flush with the back surface of the body.

2. The backlight module according to claim 1, wherein the one or more heat dissipation elements comprise a heat dissipation element protruding from the body.

3. The backlight module according to claim 1, wherein the one or more heat dissipation elements comprise heat dissipation elements having different heights from the body.

4. The backlight module according to claim 1, wherein the one or more heat dissipation elements comprise a heat dissipation element directly contacting a corresponding heat source.

5. The backlight module according to claim 1, wherein the one or more heat dissipation elements comprise a heat dissipation element with a heat dissipation pad disposed between the heat dissipation element and a corresponding heat source.

6. The backlight module according to claim 1, wherein the one or more heat dissipation elements comprise a heat dissipation element formed with fins.

7. The backlight module according to claim 1, wherein the one or more heat sources comprise a light emitting device of the light source.

8. The backlight module according to claim 1, wherein a material of the body of the back cover has a higher mechanical strength than a material of the one or more heat dissipation elements.

9. The backlight module according to claim 1, wherein the light source is a direct type light source.

10. A display, comprising:
a display front bezel;
a display back cover;
a display panel disposed between the display front bezel and the display back cover; and
a backlight module disposed between the display front bezel and the display back cover, the backlight module substantially disposed at a backside of the display panel, the backlight module comprising:
a front bezel;
a back cover disposed opposite to the front bezel, the back cover comprising:
a body having one or more openings corresponding to one or more heat sources; and
one or more heat dissipation elements disposed in the one or more openings, respectively; and
a light source disposed between the front bezel and the back cover;
wherein the body has a front surface toward the front bezel and the light source and a back surface opposite to the front surface, and the one or more heat dissipation elements comprise a heat dissipation element flush with the back surface of the body.

11. The display according to claim 10, wherein the one or more heat dissipation elements comprise a heat dissipation element protruding from the body.

12. The display according to claim 10, wherein the one or more heat dissipation elements comprise heat dissipation elements having different heights from the body.

13. The display according to claim 10, wherein the one or more heat dissipation elements comprise a heat dissipation element directly contacting a corresponding heat source.

14. The display according to claim 10, wherein the one or more heat dissipation elements comprise a heat dissipation element with a heat dissipation pad disposed between the heat dissipation element and a corresponding heat source.

15. The display according to claim 10, wherein the one or more heat dissipation elements comprise a heat dissipation element formed with fins.

16. The display according to claim 10, wherein the one or more heat sources comprise a light emitting device of the light source.

17. The display according to claim 10, wherein a material of the body of the back cover has a higher mechanical strength than a material of the one or more heat dissipation elements.

18. The display according to claim 10, wherein the display panel is a liquid crystal display panel, and the backlight module is a direct type backlight module.

* * * * *